May 27, 1924.
W. R. DONALDSON
AUTOMATIC INFLATING VALVE AND PRESSURE GAUGE
Filed March 18, 1922　　2 Sheets-Sheet 1
1,495,679
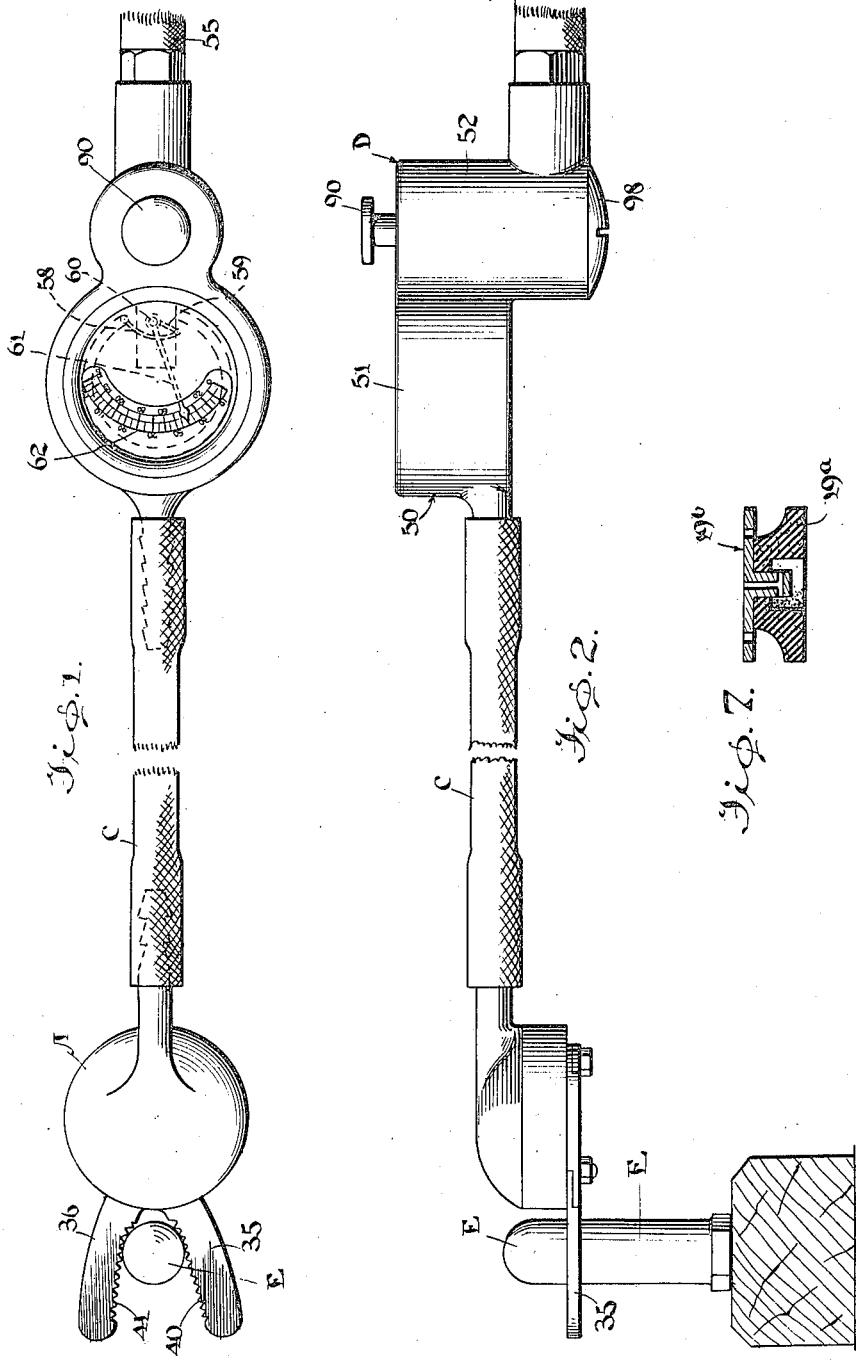

May 27, 1924.
W. R. DONALDSON
AUTOMATIC INFLATING VALVE AND PRESSURE GAUGE
Filed March 18, 1922  2 Sheets-Sheet 2
1,495,679
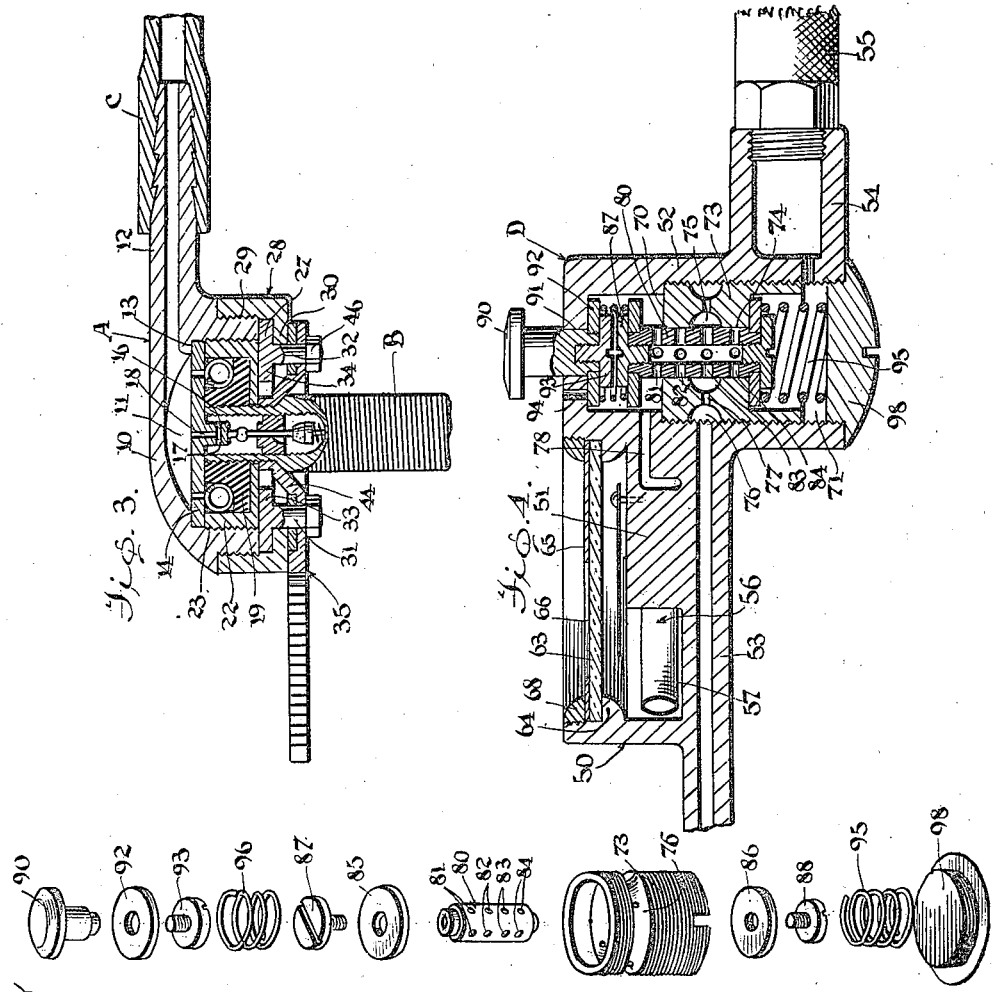
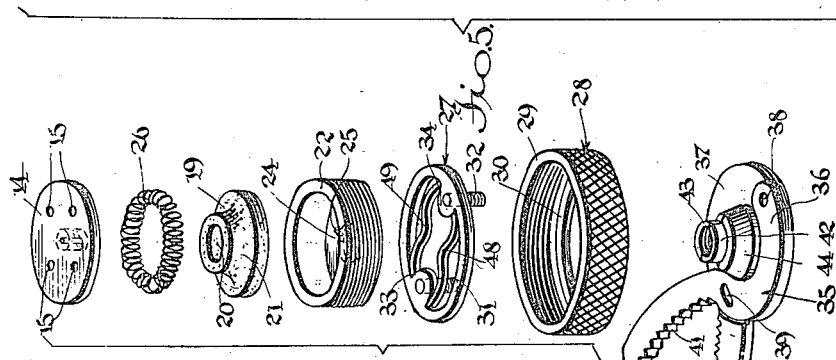
WITNESSES
INVENTOR
W. R. Donaldson,
BY
ATTORNEYS Patented May 27, 1924.

1,495,679

UNITED STATES PATENT OFFICE.

WALTER RICHARD DONALDSON, OF PHOENIX, ARIZONA.

AUTOMATIC INFLATING VALVE AND PRESSURE GAUGE.

Application filed March 18, 1922. Serial No. 544,796.

*To all whom it may concern:*

Be it known that I, WALTER RICHARD DONALDSON, a citizen of the United States, and a resident of Phoenix, in the county of Maricopa and State of Arizona, have invented certain new and useful Improvements in Automatic Inflating Valves and Pressure Gauges, of which the following is a specification.

This invention relates to an improved automatic inflating valve and pressure gauge for use with the pneumatic tires of automobiles or other vehicles.

The object of the invention is to provide a device of this character which enables the operator to control the inflating operation and to gauge the pressure within the tire while standing in an erect and comfortable position and without removing the inflating valve from the tire valve stem and applying a gauge thereto.

Another object is to provide a device of this character wherein the inflating operation and the gauging operation are entirely under the control of the person using the device and wherein the gauge is automatically vented prior to the inflating operation so that the subsequent operations will be accurate and reliable.

A further object is to provide an automatic quick-detachable tire valve connection having means for facilitating the removal of the dust cap from the tire valve stem without necessitating the use of pliers or the like.

Another object of the invention is to provide a device of this character which may be readily and securely, although releasably associated with the valve stem of a pneumatic tire irrespective of the type of wheel upon which the tire is mounted, the automatic quick-detachable tire valve connection being adapted to carry out its functions not only with the light type of artillery or wooden wheels having relatively great clearance or working space but also with the heavy type of wheels used on the rear end of heavy cars, and also with wire wheels or disk wheels.

Another object is to provide an automatic tire inflating valve and gauge of extremely simple and durable construction, universal in its action and so organized that its various parts may be removed for purposes of cleaning, replacement and repair.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a plan view, illustrating a preferred embodiment of the invention;

Figure 2 is a view thereof in side elevation;

Figure 3 is a detail view in transverse vertical section, showing the automatic tire valve connection in position on a tire valve stem, parts being broken away and parts being shown in section for the sake of illustration;

Figure 4 is a similar view of the pressure gauge and distributing valve;

Figure 5 is a group view in perspective, illustrating the parts of the distributing valve assembly prior to their organization in the valve casing;

Figure 6 is a similar view, showing the parts of the automatic tire valve connection prior to their assembly with their casing; and Figure 7 is a detail view of a modified form of packing or coupling washer.

Referring to the drawings wherein for the sake of illustration is shown the preferred embodiment of the invention, the automatic tire valve connection is designated generally at A and is adapted to be associated with the tire valve stem B of a pneumatic tire in the manner shown in Figure 3 and by means of a flexible pipe C is connected with a combined gauge and distributing valve D. The organization of the combined gauge and distributing valve with the automatic tire valve connection enables the operator to carry out and control the inflating operation and also to carry out and control the gauging operation while standing in an upright position thus relieving him of the necessity of bending down to the tire valve stem and of removing the tire inflating valve and applying the gauge.

The automatic tire valve connection is shown in detail in Figures 3 and 6 and includes a casing 10 chambered, as at 11 and having a stem 12 affording communication between the chamber of the casing and the pipe C. The chamber 11 of the casing 10 is machined to provide a shoulder 13 against which a ported plate or disk 14 is seated, the ported plate 14 having ports 15 intermediate the center of the disk in the periphery thereof. A boss 16 is integrally formed with the plate 14 at the center thereof and in the assembly the boss depends from the plate 14 as shown in Figure 3, and the boss and the plate are provided with ports 17 and 18, the port 17 extending transversely of the boss and the port 18 extending longitudinally of the boss and through the plate and communicating with the port 17. A packing or coupling washer 19 is arranged next to the plate 14 and is formed with an axial opening 20 and is also cut away around its upper marginal edge, as at 21. This washer 19 is supported in position by means of a retaining cup 22 having threaded engagement, as at 23, with the casing 10 and engaging the washer 19 and forcing it against the plate 14. The base of the retaining cup is provided with an axial opening 24 and diametrically opposite slots 25, the opening admitting of the passage of the valve stem of the tire valve and the slots 25 facilitating the engagement of a screw driver or other suitable tool with the retaining cup to assemble and disassemble it. The arrangement is such that the boss 18 is arranged axially of the opening 20 of the washer 19 and the ports 15 of the plate 14 overlie the cutaway portion 21 of the washer so that the pressure may flow through these ports and be active to urge the washer into operative engagement with the tire valve, as shown in Figure 3. This pressure is usually effective to efficiently accomplish packing or sealing engagement between the washer and the stem of the tire valve but if desired an endless coil spring 26 may be employed, the coil spring being received in the space provided by cutting away the washer and supplementing the action of the pressure. It is to be understood however that this coil spring 26 may be dispensed with when desired leaving the pressure alone to carry out this function.

A rotatable carrier 27 is provided and comprises a ring or annular plate supported for rotary motion by means of the cap or ferrule 28 having a body portion 29 threaded onto the casing 10 and having a flange 30 engaging the underside of the carrier 27. Studs 31 and 32 depend from ears 33 and 34 provided upon the carrier and upon these studs a chuck or coupling designated generally at 35 is supported. The chuck or coupling 35 comprises a pair of pivoted levers 36 and 37 respectively, the lever being crossed and being pivotally connected at one end, as at 38 by means of the stud 32, the levers having sliding connection at the point of their cross by means of a pin and slot arrangement constituted by slots 39 formed in the levers and the stud 31 which performs the function of the pin. The arms or portions of the levers beyond the sliding connection 39 constitute handles and have their confronting faces serrated or toothed, as indicated at 40 and 41. The levers 36 and 37 carry jaws 42 and 43, respectively, the jaws being integrally formed or rigidly connected with the levers and having their faces threaded so that the threads of their faces may mesh with the threads of the tire valve stem, as indicated in Figure 3 so as to securely lock the automatic valve connection to the valve stem of the tire valve. Between the jaws 42 and 43 and the levers there is provided an inclined and smooth guiding portion 44, as clearly shown in Figures 3 and 6. Nuts 45 and 46 are threaded on the lower end of the studs 31 and 32 and prevent the chuck from falling therefrom. Springs 48 and 49 are mounted upon the carrier 27, as clearly shown in Figure 5, and these springs engage the periphery of the jaws 42 and 43 in the assembly and urge these jaws toward each other.

As shown in Figures 1 and 2, the portions of the levers 35 and 36 which carry the toothed or serrated portions 40 and 41 are adapted to be used to remove the dust cap E of the tire valve, as clearly shown in Figures 1 and 2. After the dust cap has been removed, the arms or portions of these levers 35 and 36 upon which the jaw faces 40 and 41 are formed are grasped so as to swing the jaws 42 and 43 of the chuck away from each other thus permitting these jaws to be slipped down over the valve stem of the tire valve B. This valve stem also readily enters the opening 20 of the washer 19 since the pressure is not active against the washer at this time. When the inflating valve is properly positioned on the tire valve stem the levers 35 or 36 are released and the springs 47 and 48 urge the jaws 42 and 43 into engagement with the valve stem so that the threads of the jaws mesh with the threads of the valve stem. At this time the lower end of the boss 16 engages the stem or pin of the valve and depresses it to open the tire valve automatically. It is to be noted that as the chuck 35 is swiveled on the casing it may be turned to any position which may be convenient and which may facilitate the association of the inflating valve and the tire valve.

The combined gauge and distributing valve D comprises a casting or stock 50 having a portion 51 constituting a gauge block and a portion 52 constituting a valve block. The stock 50 has a passage 53 leading therethrough and affording connection with the pipe C and the valve block is provided with a connection 54 which is coupled with a pipe 55 leading to a compressor or other source of compressed air. The gauge block 51 is suitably machined to house a Bourdon gauge 56 comprising essentially a blind curved tube 57 oval in cross section and having its open end arranged so as to be adapted to be communicated with the air pressure to be registered so that a variation in pressure of the fluid causes antielastic bending of the tube, the free blind end of which is connected by a link 58 to an arm 59 of a short shaft or pin 60 to which the pointer 61 of the gauge is also connected, the pointer coacting with a scale or indicia 62. Preferably the pointer and scale are luminous so as to be visible at night. A transparent panel of glass or the like, indicated at 63 overlies the pointer and scale, the transparent panel being supported upon an annular shoulder 64. A guard plate 65 having a window 66 therein is superposed on the transparent panel and both the panel and the guard plate are retained in position by means of a retaining ring 68.

The controlling and distributing valve assembly, which is designated generally at 70, is arranged in a chamber 71 formed in the valve block 52 and includes a valve plug 73 having threaded connection with the valve block and having an axial opening or bore 74 and annular grooves 75 and 76 formed on its inner and outer peripheries and communicating with each other through a transversely extending series of ports 77. Preferably the annular grooves 75 and 76 are of semi-circular cross section as shown in Figure 4. The opening of the stem 53 communicates with the annular groove 76. Below the valve plug 73 the connection 54 communicates with the chamber 71 and above the valve plug a duct 78 is provided in the gauge block 51 and leads from the upper part of the chamber 71 into the blind tube of the gauge. A hollow cylindrical valve sleeve 80 is operatively fitted in the axial opening or bore 74 of the plug and is adapted to control the flow of the fluid from the compressor to the tire valve connection or from the tire to the gauge or to the atmosphere, as desired. For this purpose the sleeve valve 80 is provided with four series of ports which extend from the bore or opening through the body of the sleeve valve to its outer periphery and which are designated at 81, 82, 83 and 84, respectively, and which are arranged about the circumference of the sleeve valve. The upper and lower ends of the sleeve valve are formed with reduced extensions upon which washers or plate valves, designated at 85 and 86 are arranged. The washers or plate valves 85 and 86 are secured in position on the sleeve valve by means of screws 87 and 88 having threaded connection with the inner wall of the sleeve valve. At the upper end of the valve block an operating button 90 is arranged, the operating button being arranged exteriorly of the valve block and extending through the opening 91 provided therefor so that a portion of the operating button extends into the chamber 70 and such portion of the operating button has connected thereto a washer or plate valve 92 by means of a screw 93, the washer or plate valve 92 controlling an air vent or port 94 provided in the upper end of the valve block adjacent the operating button. The operating button 90 is adapted to control the sleeve valve 80 since it may be depressed so as to cause the screw 93 connected with it to engage the screw 87 connected with the sleeve valve and thus to depress the sleeve valve to bring about the operation to be hereinafter more fully described. It is to be noted that in one position of the operating abutment and sleeve valve there is a clearance between the screws 93 and the screw 87, this clearance being sufficient to enable deflating of the tire as will be understood.

The arrangement of the series of ports 81, 82, 83 and 84 is such that when the valve is disposed in the position shown in Figure 4, to which it is urged by the pressure, the gauge will be in communication with the pressure in the tire since this pressure flows from the tire valve connection through the pipe C and stem 53 into the annular groove 76 and thence through ports 77, annular groove 75, ports 83, and bore of the sleeve valve through ports 81, and duct 78 to the gauge. The pressure at this time also maintains the plate 92 up against the air vent or pipe 94. In this manner the pressure of air in the tire is registered. If it is desired to relieve the gauge of air pressure or bleed it before registering the pressure, this may be done by depressing the button 90 to such an extent as to force the sleeve valve downwardly so that the ports 81 are just disposed within the valve plug whereby the compressor and tire are both cut off from the gauge while the air vent 94 is open thus bleeding the air gauge since any air pressure therein flows out into the atmosphere. Then when the thumb button is released the air pressure of the tank or compressor forces the sleeve valve upwardly and then the pressure of the air in the tire forces the plate valve 92 upwardly so as to close the air vent 94, the tire pressure then flowing through the duct 78 into the air gauge to accurately register the air pressure in the tire. If it is desired to supply additional air pressure to the tire, the thumb button 90 is depressed as far as it may be and such operation brings ports 82 into communication with the annular groove 75 and the ports 84 into communication with the air pressure in the lower portion of the chamber 71 and closes the ports 81 and 83 since at this time the ports 81 and 83 are disposed in the opening of the valve plug the wall of which snugly fits against the sleeve valve. It is to be noted that the plate valve or washer 85 engages one end of the valve plug in one position of the sleeve valve and the plate valve or washer 86 engages the other end of the valve plug in the other position of the sleeve valve to prevent leakage of air between the outer periphery of the sleeve valve and the wall of the bore of the plug. At this time the air pressure flows from the compressor through the pipe 55 and connection 54 into the lower portion of the chamber 71 and thence through the ports 84 into the bore of the sleeve valve and out through the ports 82 into the annular groove 75 and from the annular groove 75 through the ports 77 and annular grooves 76 into the stem 53 from whence it flows through the pipe C and the connection A into the valve stem B of the tire. At any time during the inflating operation the pressure in the tire may be conveniently gauged by simply releasing the thumb button whereupon the pressure forces the valves and thumb button to the position shown in Figure 4 and exposes the gauge to the pressure in the tire. The distributing valve may also be used to deflate the tire by depressing the button 90 to such an extent that the air vent 94 is uncovered or opened while the sleeve valve 80 is not depressed, the clearance between the screws 93 and 87 allowing of this action. It is obvious that if the port 94 is uncovered and the sleeve valve is permitted to remain in the position shown in Figure 4 any air pressure in the tire and in the gauge will be exhausted through the air vent. It has been found that the pressure is effective to return and maintain the plate valve 94 and button 90 as well as the sleeve valve 80 in the position shown in Figure 4 but if desired the pressure may be supplemented by the action of springs 95 and 96, the spring 95 engaging the plate valve 86 and forcing the sleeve valve upwardly and the spring 96 engaging the valves 85 and 92 and forcing the valve 92 to position to cover the air vent 94. It is to be understood however that these springs may be dispensed with and are to be dispensed with, if desired. The lower portion of the valve block includes a removable cap or closure 98 which affords access to the valve assembly. In lieu of constructing the packing or coupling washer 19 of the quick detachable connection after the manner shown in Figures 3 and 6, this washer may be constructed as shown in Figure 7. As shown in Figure 7, the packing or coupling washer is designated at 19<sup>a</sup> and includes an inwardly extending lip 19<sup>b</sup> adapted to be engaged by the top edge of the tire valve stem and pressed or urged against the plate 14 to insure more efficient packing action by the washer.

I claim:

1. In a device for inflating, deflating and gaging the pressure in pneumatic tires and designed for use with an air line, a stock carrying an air gauge and having a chamber formed therein, a valve plug arranged in the chamber and provided with an axial bore and communicating inner and outer peripheral grooves disposed intermediate its ends, the chamber on one side of the valve plug communicating with the air gauge and having a port leading to the atmosphere, the chamber on the opposite side of the valve plug communicating with the air line, said stock being formed with an outlet passage communicating with the outer peripheral groove of the valve plug, a sleeve valve slidably fitted in the bore of the plug and having a plurality of series of transverse ports arranged at spaced intervals along its length, said valve being adapted to be shifted in the bore of the sleeve to afford communication between the air line and the outlet passage or between the end of the chamber communicating with the gauge and the outlet passage, plate valves carried by the end of the sleeve valve and cooperable with the end of the valve plug, and a thumb button mounted on the stock and engageable with the sleeve valve assembly for controlling the same, said thumb button carrying a plate valve controlling the port leading to the atmosphere.

2. In a device for inflating, deflating and gaging the pressure in pneumatic tires and designed for use with an air line, a stock carrying an air gauge and having a chamber formed therein, a valve plug arranged in the chamber and provided with an axial bore and communicating inner and outer peripheral grooves disposed intermediate its ends, the chamber on one side of the valve plug communicating with the air gauge and having a port leading to the atmosphere, the chamber on the opposite side of the valve plug communicating with the air line, said stock being formed with an outlet passage communicating with the outer peripheral groove of the valve plug, a sleeve valve slidably fitted in the bore of the plug and having a plurality of series of transverse ports arranged at spaced intervals along its length, said valve being adapted to be shifted in the bore of the sleeve to afford communication between the air line and the outlet passage or between the end of the chamber communicating with the gauge and the outlet passage, and a thumb button mounted on the stock and engageable with the sleeve valve assembly for controlling the same, said thumb button carrying a plate valve controlling the port leading to the atmosphere.

3. In a device for inflating, deflating and gaging the pressure in pneumatic tires and designed for use with an air line, a stock carrying an air gauge and having a chamber formed therein, a valve plug arranged in the chamber and provided with an axial bore and inner and outer communicating peripheral grooves intermediate its ends, the valve chamber on one side of the plug communicating with the air gauge and on the opposite side of the plug communicating with the air line, said stock being formed with an outlet passage communicating with the outer peripheral groove of the valve plug, a sleeve valve mounted in the axial bore of the valve plug and having a plurality of spaced ports therein, said sleeve valve being adapted to be shifted in the valve plug so that the ports afford communication between the air line and the outlet passage or between the outlet passage and the gauge, and operating means for the sleeve valve.

4. In a device for inflating, deflating and gaging the pressure in pneumatic tires and designed for use with an air line, a stock carrying an air gauge and having a chamber formed therein, a valve plug arranged in the chamber and provided with an axial bore and inner and outer communicating peripheral grooves intermediate its ends, the chamber on one side of the valve plug communicating with the air gauge and having a port leading to the atmosphere, the chamber on the opposite side of the valve plug communicating with the air line, said stock being provided with an outlet passage communicating with the outer peripheral groove of the valve plug, a ported sleeve valve mounted in the axle of the bore of the plug and adapted to be shifted therein to establish communication between the air line and the outlet passage or between the outlet passage and the air gauge and a thumb button mounted on the stock and engageable with the sleeve valve for shifting the same though slightly spaced from the sleeve valve so as to be susceptible of movement prior to its engagement with the sleeve valve and a valve carried by the thumb button and controlling the port leading to the atmosphere.

5. In a device for inflating, deflating and gaging the pressure in pneumatic tires and designed for use with an air line, a stock having an air gauge and having a chamber formed therein and communicating with the gauge, said chamber communicating with the air line and said stock having a port leading from said chamber to the atmosphere and having an outlet passage leading from said chamber, and valve means operatively mounted in the chamber and adapted to selectively establish communication between the air line and the outlet passage and simultaneously establish communication between the air gauge and the atmosphere, or to establish communication between the air gauge and the outlet passage, or between the outlet passage and the port leading from the atmosphere.

6. In a device of the character described, a stock having a chamber formed therein, a valved plug arranged in the chamber and provided with an axial bore and communicating inner and outer peripheral grooves disposed intermediate its ends, a sleeve valve slidably fitted in the bore of the plug and having a plurality or series of transverse ports arranged at spaced intervals along its length, said valve being adapted to afford communication between either end of the chamber and the intermediate ports and grooves of the valve plug, plate valves carried by the end of the sleeve valve cooperable with the ends of the valve plug and operating means for said sleeve valve assembly.

WALTER RICHARD DONALDSON.